Figure 1:
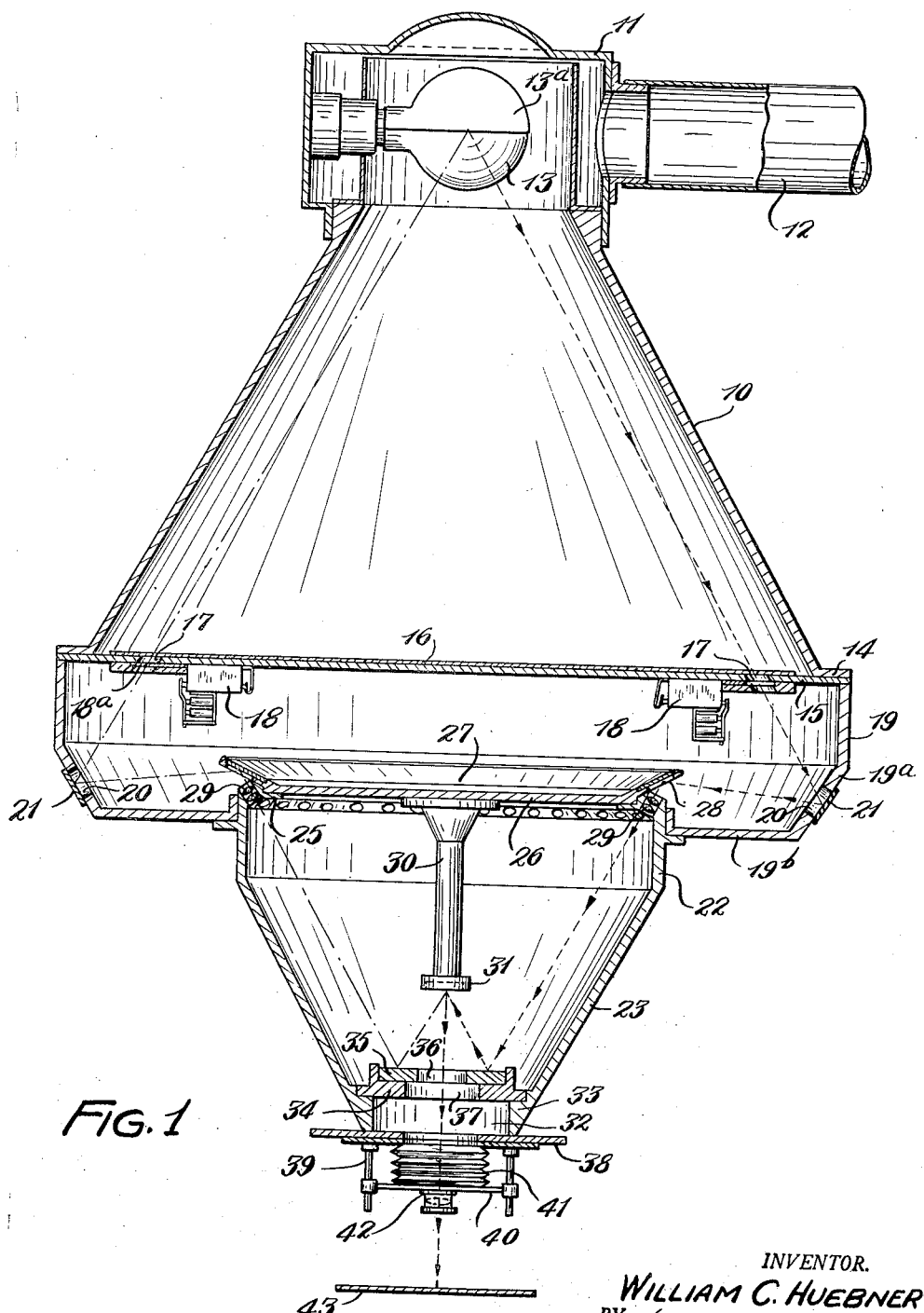

Sept. 25, 1956 W. C. HUEBNER 2,764,071
OPTICAL SYSTEM FOR PHOTO-COMPOSING APPARATUS
Filed March 12, 1953

INVENTOR.
WILLIAM C. HUEBNER
BY Hudson, Boughton,
Williams, David & Hoffmann
ATTORNEYS United States Patent Office 2,764,071
Patented Sept. 25, 1956

2,764,071

OPTICAL SYSTEM FOR PHOTO-COMPOSING APPARATUS

William C. Huebner, New Rochelle, N. Y., assignor to The Huebner Company, Dayton, Ohio, a corporation of Ohio Application March 12, 1953, Serial No. 341,922

4 Claims. (Cl. 95—4.5)

This invention relates to an optical system for a photographic composing apparatus.

In my issued Patent 2,180,417, November 21, 1939, there is disclosed and claimed an apparatus for photographically composing type characters. In my said Patent 2,180,417 light is selectively passed through the various characters or letters or symbols of a master character plate or member and is projected by an optical system upon a light sensitive medium to be photographically reproduced on the latter.

More specifically my said Patent 2,180,417 discloses an apparatus comprising a font or set of printing or type characters including the lower and upper case letters, numerals, punctuation marks, signs, symbols, etc. necessary for use in composing printed or reading matter. These type characters are disposed in a circular group or series on a master character plate or member and light is projected through the characters by an optical projecting system including shutters operable for selectively or individually projecting images of the printed characters of such font for exposure in required relation on the sensitized or light sensitive surface of a film or other medium which is movable for receiving thereon in required positions the successively projected character images.

In my prior patented construction the optical system is such that the character images are projected to a single master position or focal plane and the images thereof photographically reproduced on a negative or other member having a light sensitive coating thereon. Also in my patented apparatus the images or any desired ones thereof can be photographed in various sizes compared to the size of the character on the master character plate or of the same size as the character on the master character plate.

The present invention embodies an improvement over the construction shown in my prior Patent 2,180,417, and particularly over the optical system disclosed in said patent.

An object of the invention is to provide an optical system for a photographic composing apparatus of the type referred to and which system produces a uniform field of illumination, thus improving the photographing of the images on the light sensitive film or plate of the apparatus.

A further object is to provide an optical system for a photographic composing machine which produces a balanced light field on a target located on and perpendicular to the focal axis of the camera, wherefore the lens of the camera more effectively picks up the image so that a sharp image with extremities of white and black can be photographed or recorded upon the film or sensitized plate.

A further object is to provide an optical system for a photographic composing apparatus such that all portions of the reproduced characters are equally sharp and such reproduced characters are clear cut, decisive and have the correct density.

Further and additional objects and advantages not hereinbefore referred to will become apparent hereinafter during the detailed description of an embodiment of the invention which is to follow. Referring to the accompanying drawing, Fig. 1 is a cross section through that portion of a photographic composing apparatus which mounts the master character plate or member and the optical system which embodies the present invention.

It will be understood that the photographic composing apparatus in which the optical system embodying the present invention is utilized will include a suitable support for the film or sensitized plate upon which the characters are to be photographically reproduced and also will include a suitable key board for selectively actuating the shutters which control the passage of light through the different characters of the master character plate, all as more fully described in my said Patent 2,180,417. In view of the disclosure of my said Patent 2,180,417 it is not believed necessary to illustrate herein more of the apparatus than is shown in Fig. 1.

Referring to Fig. 1, the portion of the composing apparatus illustrated comprises a conical dome 10, at the small end of which is located a light housing 11, it being understood that the light housing 11 and the conical dome 10 are interconnected so that exterior light does not enter the housing and dome while interior light therein does not escape therefrom. The light housing 11 may be connected to a suitable exhaust duct 12 extending to a suction device for exhausting from the housing heat generated by the light source arranged in the housing. If desired, an inlet duct (not shown) might be connected to the housing 11 for injecting into the housing cool air or other medium to reduce the temperature of the interior of the housing.

It has been found in practice that a single light source of predetermined and sufficient brilliance may be used to produce the required light field for projecting light-selectively through all of the characters of the master character plate. In Fig. 1 such single light source is illustrated as an electric lamp 13 mounted in the light housing 11 so as to have the focal axis of the lens of the camera, later to be referred to, pass centrally through the lamp.

The lamp 13 is coated on the upper half of its bulb with a reflective coating indicated at 13a. Of course in place of the single light source illustrated a plurality of electric lamps corresponding in number to and correlated with the characters on the master character plate may be used all as is illustrated in my said Patent 2,180,417.

The large end of the conical dome 10 is provided with an outwardly extending annular flange 14 which bears against and can be detachably secured to one side of a circular plate 15 which supports the master character plate later to be referred to. It will be understood that the flange 14 is secured to the plate 15 by any suitable means and that the light source 13 serves to equally and brilliantly illuminate that side of the plate facing the interior of the dome 10. It will also be understood that the joint between the flange 14 and the plate 15 is impervious to the passage of light therethrough.

The master character plate is indicated at 16 as supported on the side of the plate 15 within the dome 10 and in a single plane. The master character plate 16 is accurately secured in position by suitable means such as the means provided for that purpose in my said Patent 2,180,417.

The master character plate is provided with a circular series of characters as is the master character plate in my said Patent 2,180,417. This circular series of characters on the master character plate may comprise a font or set of print or type characters, numerals, punctuation marks or other desired signs or symbols depending upon what it is desired to reproduce. It will be understood that the various master character plates having thereon different series of characters or symbols can be inserted into and fastened in operative position on the plate 15 as desired.

Each character or symbol of the circular series on the master character plate overlies an opening 17 of a circular series of openings formed in the plate 15. On the side of the plate 15 remote with respect to the dome 10 and opposite to the side upon which the master character plate 16 is mounted a circular series of identical shutter devices are secured, two of said shutter devices being indicated in Fig. 1 at 18.

It will be understood that there are as many shutter devices 18 as there are openings 17 in the plate 15 and that each device includes a movable shutter 18a for closing its respective opening 17.

The shutter devices 18 may take any desired construction as, for instance, they may be electrically actuated shutter devices such as shown in my said Patent 2,180,417 or they may be electrical-pneumatic shutter devices such as shown in my Patent 2,402,750, issued June 25, 1946.

It will also be understood that the shutter devices can be selectively actuated through a suitable keyboard to selectively move the shutters 18a thereof to open selectively the openings 17 in the plate 15, all as described and disclosed in detail in my said Patent 2,180,417.

Secured to the side of the plate 15 which carries the shutter device 18 is the open end of a cylindrical housing 19, it being understood that the joint connection between the open end of the cylindrical housing 19 and the plate 15 is impervious to the passage of light.

The housing 19 has a truncated conical portion formed by the inwardly inclined side wall 19a and by the planular end wall 19b which is parallel to the plate 15. The side wall 19a is provided with a circular series of openings 20 correlated to the openings 17 in the plate 15 and each of said openings 20 is closed by a front surface reflector 21 secured to the outer side of the side wall 19a. The closed or end wall 19b of the cylindrical housing 19 is provided with an opening the center of which is located on the longitudinal center line through the portion of the apparatus disclosed.

Secured in this central opening in the end wall 19b is the cylindrical large end 22 of a target housing which also has extending from the large end 22 a conical portion 23. The cylindrical large end 22 of the target housing extends into the truncated conical portion of the cylindrical housing 19 and is provided at its inner end with a circular lens supporting rim 24 from which projects radially inwardly an annular flange 25 that is parallel to the plate 15. It will be understood that the connection between the target housing and the cylindrical housing 19 is such as to be impermeable to the passage of light into or from the housings.

The annular flange 25 supports a circular plate or disk 26 which adjacent to the lens supporting rim 24 has an angularly flared annular flange 27 which supports on its outer side an annular front surface reflection 28. The lens supporting rim 24 mounts a circular series of focusing lenses 29, said lenses corresponding in number to the openings 17 in the plate 15 and the front surface reflectors 21 and correlated thereto in a manner later to be pointed out.

The disk 26 mounts centrally of its side that is remote with respect to the plate 15 a post or column 30 that extends coincidentally with the longitudinal center line of the construction and which has at its free end a circular target 31, the exposed surface of which is coated or otherwise provided with a suitable light reflecting material as for instance magnesium.

The small or outer end of the conical portion 23 of the target housing is open as indicated at 32 and is provided inwardly of the open end with a shouldered annular rib 33 that supports on the shouldered portion thereof a circular supporting member 34 for a flat front surface reflector disk 35 that is parallel to the target 31 and to the plate 15 and which is provided with an opening 36 the center of which is located on the longitudinal center line of the construction. The support 34 for the reflector disk 35 is also provided with a central opening 37 concentric to the opening 36 but indicated as larger in diameter than the latter.

Secured to the end of the conical portion 23 of the target housing is a plate 38 provided with a central opening coaxial with the openings 36 and 37. Extending from the plate 38 are parallel rods 39 which slidably and adjustably support a frame 40 of a camera and which frame is connected with the plate 38 by the bellows 41. The frame 40 also mounts the lens 42 of the camera and the focal axis of said lens extends centrally through the openings 37 and 36 and the center of the target 31 and is perpendicular to the latter and to the plane 43 in which the film or light sensitive plate is supported and upon which the characters are to be photographically reproduced.

It will be understood that adjustment of the frame 40 on the rods 39 effects changes in size of the characters that are photographed or reproduced on the film or sensitized plate, all as fully described in my said Patent 2,180,417.

It will also be understood that the film or sensitized plate located in the plane 43 is mounted and supported in any suitable way so long as it is parallel to the target surface 31, as for instance in the manner disclosed in my said Patent 2,180,417.

Referring to Fig. 1, the dash line with the arrows thereon represents the path of light through a selected character on the master character plate 16, the correlated opening 17 in the plate 15, the open shutter 18a of the selected shutter device 18 and to the correlated front surface reflector 21. The particular shutter device selectively actuated to open the shutter 18a thereof is the right hand one of Fig. 1, it being understood that the left hand shutter device shown in Fig. 1 and the other shutter devices of the apparatus are closed and that the dot and dash lines at the left of Fig. 1 merely indicate the light path as it would be if said left hand shutter 18a were opened.

It will also be understood that similar light paths would occur if any of the other shutters of the circular series of shutters were selectively opened to reproduce a particular character.

The light path as indicated by the dash lines passes through the selected character on the character plate 16 through the correlated opening 17 in the plate 15 and is through the correlated front surface reflector 21 to reflected from the correlated front face reflector 28. The angle between the light path reflected from the reflector 21 and the light path striking the reflector 21 is approximately 53° in this instance.

The light striking the front surface reflector 28 is reflected therefrom at an angle approximately 110° and passes through the correlated focusing lens 29 and strikes the front surface reflector disk 35 from which it is reflected at approximately an angle of 60° to the planular magnesium surface of the target 31. The lens 42 of the camera through the openings 37 and 36 in the support 34 and the front surface reflector disk 35 picks up the light image projected upon the magnesium target and photographically reproduces the same on the film or sensitized plate located in the plane 43. All portions of the image plate projected upon the magnesium target are equally sharp with density contrasts clearly defined and with a brilliancy of white light effecting a reproduction on the film or sensitized plate of a sharp, decisive and clear image.

In my prior Patent 2,180,417 the light rays must be picked up by the camera lens from the focus or ground glass and said rays strike the glass and are refracted to some extent thereby. This results in certain portions of the image being less sharp than other portions thereof and fails to bring out the density contrasts in the image, with the result that the reproduced image on the film or plate may lack sharpness and clarity.

In the optical system embodying the present invention, on the other hand, the light rays are reflected from the front surface reflecting disk 35 at substantially a 60° angle to the magnesium surface of the target which is perpendicular to and centered in the focal axis of the camera lens 42, wherefore the camera len through the opening 36 in the reflector disk 35 picks up the light image projected on the target and all portions of the image will be equally sharp and the density contrasts thereof will be clearly defined. This results in an improved photographic reproduction of the character on the film or sensitized plate.

Although a preferred embodiment of the invention has been illustrated and described herein it will be understood that the invention is susceptible of such modifications and adaptations as fall within the scope of the appended claims.

Having thus described my invention I claim:

1. In an apparatus for photographically composing characters on a film or sensitized plate and of the type comprising a housing impervious to light, a master character plate positioned in a plane within the housing and having a circular series of characters, a camera the focal axis of the lens thereof extending perpendicularly to the plane of the master character plate and through the center of the circular series of characters, light source means for illuminating said characters, and an optical system for selectively projecting light images of the individual characters upon a transparent plate through which the focal axis of the camera lens extends centrally and perpendicularly and including shutters equal in number to and correlated with the different characters, reflecting elements and focusing lenses for projecting the light images upon said transparent plate to be photographed by said camera; the improvement which comprises a flat front surface reflector parallel to the master character plate and perpendicular to the focal axis of the camera lens and replacing said transparent plate and provided with a central opening through the center of which said focal axis extends, and a light reflecting target mounted within said housing in spaced relation to said flat front surface reflector and parallel thereto and through which said focal axis extends perpendicularly and centrally, said focusing lenses being disposed to project the light images onto said flat front surface reflector radially outwardly of the central opening therein from which they are reflected to said target from which the light images are picked up by the camera lens through the opening in said flat front surface reflector.

2. The improvement defined in claim 1 and wherein said target is spaced from said flat front surface reflector a distance such that the light images projected upon the flat front surface reflector are reflected therefrom along lines at substantially an angle of 60° from the lines along which the light images are projected to said flat front surface reflector by said focusing lenses.

3. The improvement defined in claim 1 and wherein said target is provided with a magnesium reflecting surface.

4. The improvement defined in claim 1 and wherein said focusing lenses, said flat front surface reflector and said target are so related that said focusing lenses project the light images upon said reflector at an angle of substantially 60° from which they are reflected at substantially an angle of 60° and strike the center of said target at substantially an angle of 60°.

References Cited in the file of this patent

UNITED STATES PATENTS

| 1,893,158 | Chireix | Jan. 3, 1933 |
| 2,180,417 | Huebner | Nov. 21, 1939 |

FOREIGN PATENTS

| 373,636 | Great Britain | May 26, 1936 |